United States Patent [19]

Takase et al.

[11] Patent Number: 4,798,105
[45] Date of Patent: Jan. 17, 1989

[54] CONTROL SYSTEM FOR AUTOMATIC TRANSMISSION PRODUCING SHOCK-FREE SHIFT

[75] Inventors: Sadao Takase; Hitoshi Takeda, both of Yokohama; Osamu Isobe, Omiya, all of Japan

[73] Assignee: Nissan Motor Co., Ltd., Yokohama City, Japan

[21] Appl. No.: 897,475

[22] Filed: Aug. 18, 1986

[30] Foreign Application Priority Data

Aug. 16, 1985 [JP] Japan ................... 60-180156

[51] Int. Cl.$^4$ .......................................... B60K 41/06
[52] U.S. Cl. ...................................... 74/866; 74/868
[58] Field of Search ................... 74/862, 865, 866, 868

[56] References Cited

U.S. PATENT DOCUMENTS

| | | | |
|---|---|---|---|
| 3,927,528 | 12/1975 | van der Kolk et al. | 74/865 X |
| 3,956,947 | 5/1976 | Leising et al. | 74/866 |
| 4,008,567 | 2/1977 | Hirsch | 74/866 X |
| 4,031,782 | 6/1977 | Miller et al. | 74/866 |
| 4,044,634 | 8/1977 | Florus et al. | 74/866 |
| 4,102,222 | 7/1978 | Miller et al. | 74/866 |
| 4,220,058 | 9/1980 | Petzold | 74/866 X |
| 4,259,882 | 4/1981 | Miller | 74/862 |
| 4,312,249 | 1/1982 | Hau et al. | 74/866 |
| 4,350,058 | 9/1982 | Miller et al. | 74/866 |
| 4,502,354 | 3/1985 | Suzuki et al. | 74/866 |
| 4,563,918 | 1/1986 | Sugano | 74/869 |
| 4,625,590 | 12/1986 | Müller | 74/866 |
| 4,633,985 | 1/1987 | Leorat | 74/866 X |

FOREIGN PATENT DOCUMENTS

| | | | |
|---|---|---|---|
| 2050468 | 8/1978 | Fed. Rep. of Germany | 74/866 |
| 2805544 | 8/1979 | Fed. Rep. of Germany | 74/866 |
| 2938268 | 4/1981 | Fed. Rep. of Germany | 74/866 |
| 52-106064 | 9/1977 | Japan | |
| 53-85264 | 7/1978 | Japan | |

OTHER PUBLICATIONS

Nissan OD Automatic Transmission L4N71B Type E4N71B Type Service Manual 1982; Nissan Motor Company, Issued Nov. 1981.

Primary Examiner—Leslie A. Braun
Assistant Examiner—Dwight G. Diehl
Attorney, Agent, or Firm—Foley & Lardner, Schwartz, Jeffery, Schwaab, Mack, Blumenthal & Evans

[57] ABSTRACT

A control system for an automatic transmission is disclosed. The control system features detecting output shaft torque, evaluating a pattern of variation detected of the output shaft torque during shifting, scheduling a variation of fluid pressure to be supplied to a friction element in response to the result of evaluation, and regulating a fluid pressure supplied to the friction element in response to the variation of fluid pressure scheduled.

11 Claims, 14 Drawing Sheets

CONTROL SYSTEM FOR AUTOMATIC TRANSMISSION PRODUCING SHOCK-FREE SHIFT

BACKGROUND OF THE INVENTION

The present invention relates to a control system for an automatic transmission, and more particularly to a control system for an automatic transmission which is designed to effect shock-free shift between gear ratios.

Laying-open Japanese patent application No. 52-106064 (corresponding to U.S. Pat. No. 4,031,782 issued to Miller et al. on June 28, 1977) discloses a control system for controlling a gear ratio of a gear train. This known control system comprises a control device for controlling the gear ratio of the gear train, and a torque sensor operatively associated with an output member of the gear train to generate an output torque indicative signal. The output torque indicative signal is supplied to the control device such that the gear ratio is controlled in response to the output torque indicative signal. This control system is directed to a precision control of a hydraulic fluid pressure supplied to a friction element which is to be engaged in effecting shifting. Laying-open Japanese patent application No. 53-85264 (corresponding to U.S. Pat. No. 4,102,222 issued to Miller et al. on July 25, 1978) discloses an electronic control system which is directed not only to a precision control of hydraulic fluid pressure supplied to a friction element which is to be engaged, but also to a precision control of hydraulic fluid pressure supplied to another friction element which is to be released. According to this known control system, a torque sensor detects an output torque of a transmission and generates an output torque indicative signal. A first control valve regulates a hydraulic fluid pressure supplied to the friction element which is to be engaged, and a second control valve regulates a hydraulic fluid pressure supplied to the another friction element which is to be released during a shift operation between gear ratios. An error signal is provided to control the operation of each of the first and second control valves. A closed loop controller is operatively coupled with the torque sensor and also with both of the first and second control valves and it receives the output torque indicative signal and generates signals as a function of the output torque indicative signal for controlling the first and second control valves.

In each of the known control systems mentioned above, a torque sensor is operatively associated with an output member of a transmission to detect an output torque and generates an output torque indicative signal. The output torque indicative signal is fed to a controller which computes an error from a desired value in output torque and generates an output signal for controlling a control valve connected to a friction element such that the output torque varies in a predetermined desired pattern, thus alleviating or avoiding substantial shift shocks.

If the feedback control employed by the above mentioned control systems is to be carried out by a control system using a microcomputer, a microcomputer capable of high speed operation is needed. Such a microcomputer is relatively expensive.

If the output signal of the torque sensor is interferred with error components, such as noise, this causes a drop in control precision of the whole system immediately since this is a realtime control. Thus, in order to prevent such a drop in control precision, a relatively expensive torque sensor that provides noise free performance is required.

The present invention aims at solving the above mentioned problems encountered in the known control systems.

An object of the present invention, therefore, is to provide a control system for an automatic transmission which does not require a transducer having a high precision performance nor an arithmetical unit capable of high speed operation.

SUMMARY OF THE INVENTION

An important feature of the present invention resides in a control unit which receives an output signal from a transducer operatively associated with a transmission output member, evaluates a pattern of variation of the transmission output torque taking place in effecting shifting and adjusts a predetermined schedule of variation of fluid pressure to be supplied to a shifting friction element in response to the result of the evaluation.

According to one embodiment of the present invention, criteria on which the above mentioned evaluation is based are the magnitude of a peak torque of the output torque and the length of time required for shift operation.

According to another feature of the present invention, disturbances which would cause a change in the transmission output torque and in turn an unnecessary adjustment of the schedule of variation of fluid pressure are eliminated by ceasing the adjustment of the schedule of variation when there occurs a change in the vehicle running condition while the recognition process is carried out by the controller.

According to a further feature of the present invention, the adjustment of the schedule of variation in fluid pressure is ceased upon detecting the abnormal operation of the transducer.

DETAILED DESCRIPTION OF THE INVENTION

Figure 1:
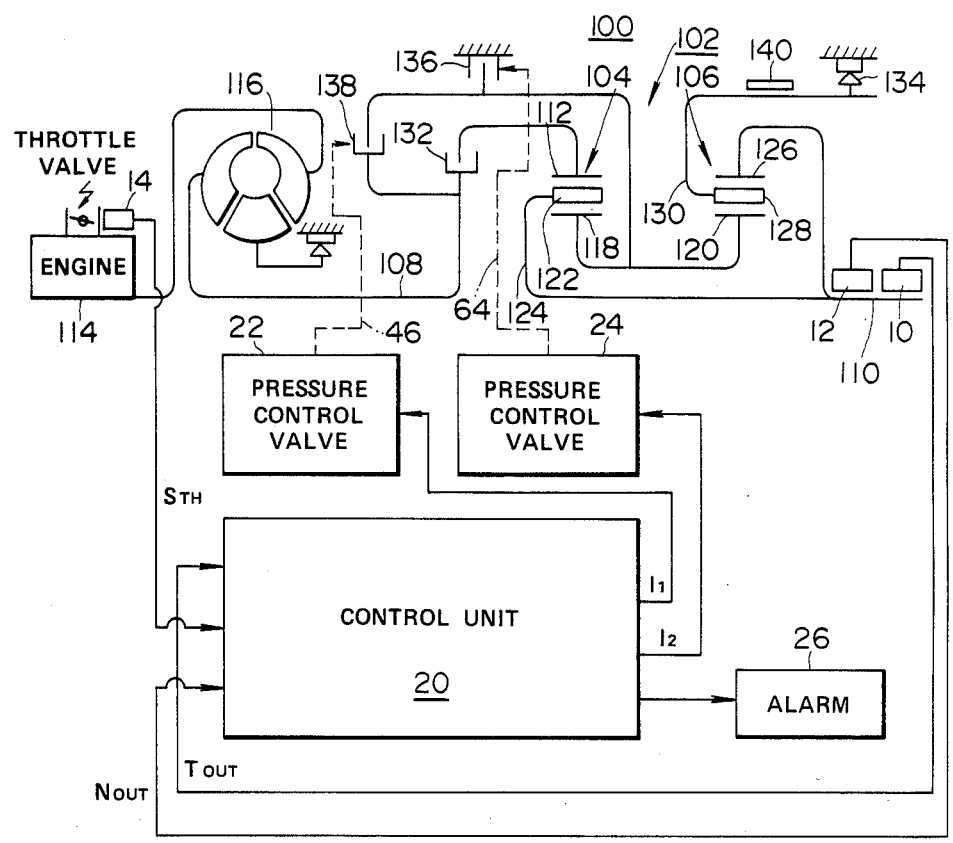
FIG. 1 is a block diagram illustrating a preferred embodiment of a control system according to the present invention.

Referring to the accompanying drawings, FIG. 1 shows an automatic transmission 100 including a planetary gear system 102. The planetary gear system 102 includes a front planetary gear set 104 and a rear planetary gear set 106, and it can provide various drive connections between a transmission input shaft 108 and a transmission output shaft 110. A ring gear 112 of the front planetary gear set 104 and the transmission input shaft 108 receive engine torque from an engine 114 via a torque converter 116, for example. Sun gears 118, 120 of the front and rear planetary gear sets 104, 106 are dvivingly connected to each other for rotation as a unit. Disposed between the ring and sun gears 112, 118 of the front planetary gear set 104 and meshing them are planet pinions 122. A carrier 124 rotatably carrying these pinions 122 is drivingly connected to the transmission output shaft 110. A ring gear 126 of the rear planetary gear set 106 is drivingly connected to the carrier 124 and thus connected to the transmission output shaft 110. Disposed between the ring and sun gears 126, 120 of the rear planetary gear set 106 and meshing them are planet pinions 128 rotatably carried by a carrier 130.

FIG. 1 also shows friction elements including a hydraulically operated forward clutch 132 which is kept engaged for forward running, but is released otherwise to interrupt driving connection between the transmission input shaft 108 and the front ring gear 112, and a one-way clutch 134 which is activated to render the rear carrier 130 operable as a reaction member to produce the first forward speed ratio. Also shown is a hydraulically operated clutch 136 serving as a brake for the common sun gears 118, 120. When it is applied, the clutch 136 holds the common sun gears 118, 120 stationary to produce the second forward speed ratio. This clutch 136 is engaged when hydraulic pressure is applied thereto, but released when hydraulic pressure is eliminated therefrom. A hydraulically operated high and revese clutch 138 is engaged to produce driving connection between the transmission input shaft 108 and the common sun gears 118, 120 when hydraulic fluid pressure is applied thereto, but released when hydraulic fluid pressure is eliminated therefrom. An upshift from the second forward speed ratio to the third speed ratio (i.e., direct drive) is carrie d out by releasing the clutch 136 and applying the high and reverse clutch 138. A hydraulically operated low-reverse band brake 140 is arranged to hold the rear carrier 130 stationary. Reverse ratio is produced when the high & reverse clutch 138 is engaged and band brake 140 is applied with the other clutches released.

FIG. 1 also shows a transducer in the form of a torque sensor 10 operatively associated with the transmission output shaft 110 to generate an electrical signal $T_{OUT}$ related to the output torque of the transmission. An output revolution speed sensor 12 is operatively associated with the transmission output shaft 110 and generates an electrical signal $N_{OUT}$ related to the revolution speed of the transmission output shaft 110. A throttle opening degree sensor 14 is operatively associated with the engine throttle valve and generates an electrical signal $S_{TH}$ related to the throttle opening degree. These electrical signals $T_{OUT}$, $N_{OUT}$ and $S_{TH}$ are fed to a control unit 20. Output signals from the control unit 20 include a solenoid drive current $I_1$ and a solenoid drive current $I_2$. The drive current $I_1$ is supplied to a pressure control valve 22 for the clutch 138, while the other drive signal $I_2$ is supplied to another pressure control valve 24 for the clutch 136. The output signals also include a signal supplied to an alarm 26 to have it produce a warning signal.

Figure 2:
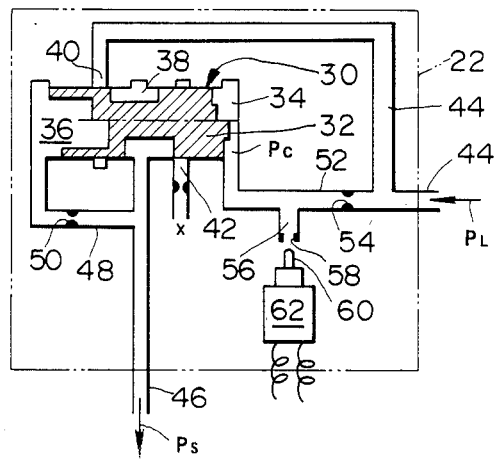
FIG. 2 is a schematic view showing the structure of each of pressure control valves used in FIG. 1.

FIG. 2 shows the structure of the pressure control valve 22. As shown, a spool valve 30 has a spool 32 movable responsive to a control pressure Pc supplied to a control chamber 34 and an output pressure Ps supplied to a feedback chamber 36. An output chamber 38 is communicable with an inlet port 40 and a drain port 42 depending on the position of the spool 32. The inlet port 40 is connected to a hydraulic fluid line 44 receiving a line fluid pressure $P_L$. The output chamber 38 is connected to an output hydraulic fluid line 46 reaching the clutch 138 to supply the output pressure thereto. The feedback chamber 36 is connected to the output chamber 38 via a feedback line 48 provided with a flow restrictor 50. The control chamber 34 is connected to the hydraulic fluid line 44 by means of a branch fluid line 52 provided with a flow restrictor 54. The branch fluid line 52 has a drain opening 56 disposed between the flow restrictor 54 and the control chamber 34. The drain opening 56 is provided with a flow restrictor 58 which is opened or closed by a plunger 60 of a solenoid 62 in response to the drive current $I_1$ from the control unit 20. The other pressure control valve 24 has the same structure as the pressure control valve 22 and supplies its output pressure through an output hydraulic fluid line 64 to the clutch 136. The output fluid pressure is controlled in response to the drive current $I_2$ from the control unit 20.

If desired, an automatic transmission producing more than three forward speed ratios may be obtained by adding an overdrive planetary gear set to the gear train shown in FIG. 1. One example of such an automatic transmission is shown and described in the publication "NISSAN OD AUTOMATIC TRANSMISSION L4N71B TYPE E4N71B TYPE SERVICE MANUAL 1982" issued by NISSON MOTOR COMPANY LIMITED on November 1981. The preceding description of the automatic transmission along with FIG. 1 is deemed to be sufficient in understanding the present invention.

Figure 3:
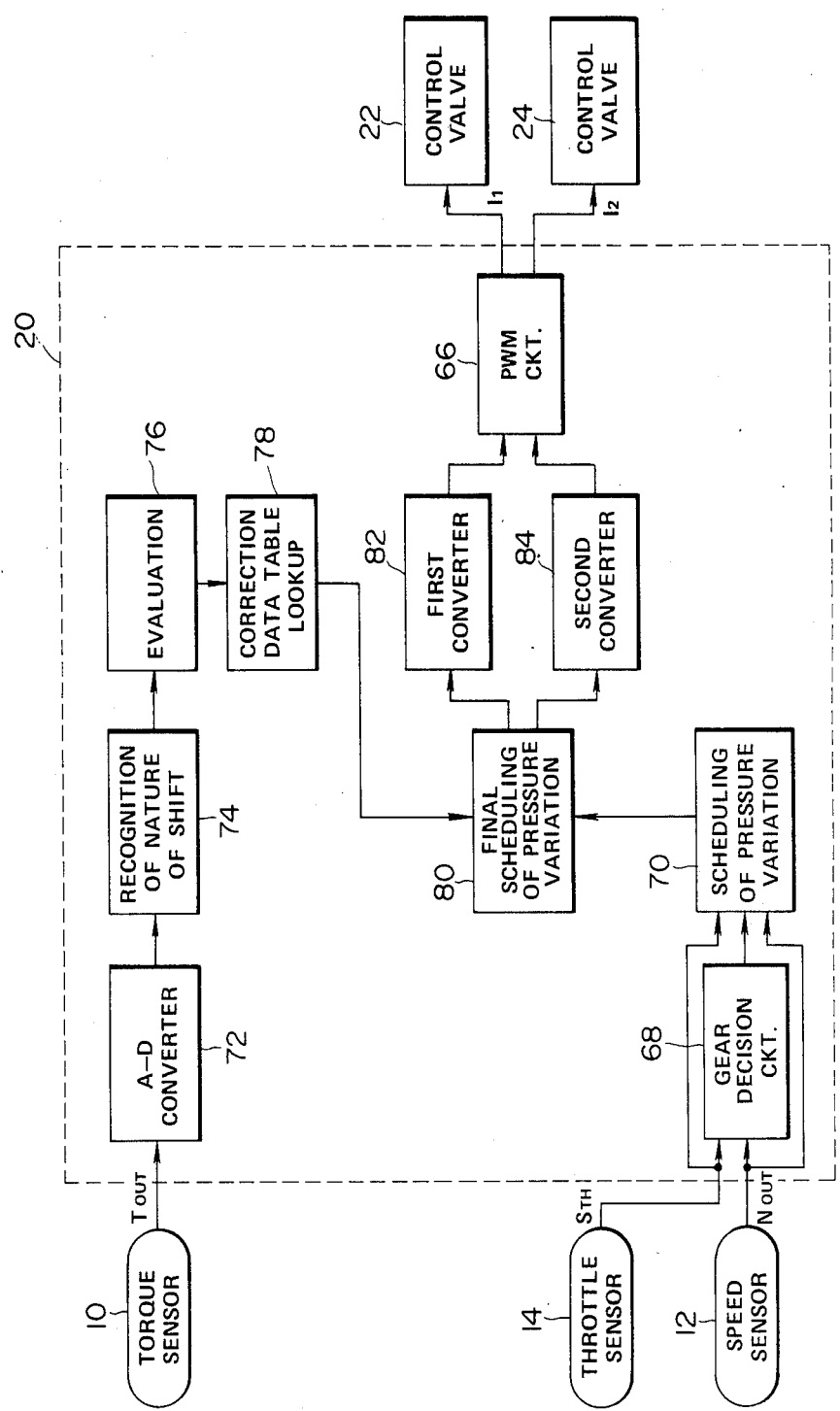
FIG. 3 is a control system diagram of a control unit embodying the main feature of the present invention.

FIG. 3 is a control system diagram of the control unit 20. The electrical signal $T_{OUT}$ is an analog signal, whereas the electrical signals $S_{TH}$, $N_{OUT}$ are digital signals, respectively. The solenoid drive current signals $I_1$, $I_2$ have their duty cycles varied by a pulse width modulator (PWM) circuit 66. The reference numeral 68 denotes a gear decision circuit which determines a speed ratio to be established using the throttle opening degree signal $S_{TH}$ and the output shaft revolution speed signal $N_{OUT}$. The gear decision circuit 68 generates instructions indicating which one of various shift demands has occurred. The various shift demands include a 1-2 upshift demand and a 2-3 upshift demand. For better understanding of the manner of determination performed by the gear decision circuit 68, reference should be made to U.S. Pat. No. 4,502,354 issued to Suzuki et al. on Mar. 5, 1986 (see a gear decision circuit 209 and the corresponding description).

The reference numeral 70 denotes a function block where the variation of pressure is scheduled for a shift to be effected using the throttle opening degree signal $S_{TH}$ and the output shaft revolution speed signal $N_{OUT}$. In this embodiment, the scheduling of variation of pressure applied to each of the clutches 138 and 136 (see FIG. 1) is made. This variation of pressure may be called as "basic pressure variation."

The electrical signal $T_{OUT}$ from the torque sensor 10 is converted into a digital signal at an A-D converter 72. The reference numeral 74 denotes a function block where the nature of a shift having occurred is recognized in terms of the magnitude of a peak in the output torque $T_{OUT}$ and the length of time required for the shift using the digital signal from the A-D converter 72. In other words, the shape of the output torque curve during the shift is recognized.

The reference numeral 76 denotes a function block where the nature of the shift having been recognized is evaluated by comparing the magnitude of peak torque and the length of time required for the shift with predetermined references, respectively, in order to discriminate whether the magnitude of the peak torque is too large to give the driver uncomfortable rapid acceleration and the length of time required for the shift is too long to cause excessive wear at the friction element to be engaged or released.

The reference numeral denotes a function block 78 where a correction data table look-up operation is performed using the result of evaluation from the block 76, a kind of shaft, and operating condition at the start of the shift. The kind of shift is determined by examining the instructions from the gear decision circuit 68 which have caused the shift. The operating condition at the start of the shift may be determined by examining the electrical signals $S_{TH}$ and $N_{OUT}$ at the start of the shift. The correction data table is stored in a memory device and contains retrievable correction data in hydraulic pressure for the clutches 138 and 136. Each of the data contained in the correction data table is modified or replaced with a new correction datum in accordance with the result of evaluation performed in the function block 76.

The reference numeral 80 denotes a function block where based on the basic pressure variation from the block 70 and the correction values from the block 78 the pressure variation to be applied to the clutches 138 and 136 is finally scheduled.

The reference numeral 82 denotes a first converter which based on the pressure variation a finally scheduled for the clutch 138 generates an output signal to be applied to the PWM circuit 66. The PWM circuit 66 modifies duty cycle of the current signal $I_1$ in response to this output signal from the first converter 82.

The reference numeral 84 denotes a second converter which based on the pressure variation finally scheduled for the clutch 136 generates an output signal to be applied to the PWM circuit 66. The PWM circuit 66 modifies duty cycle of the current signal $I_2$ in response to this output signal from the second converter 84.

Figure 4:
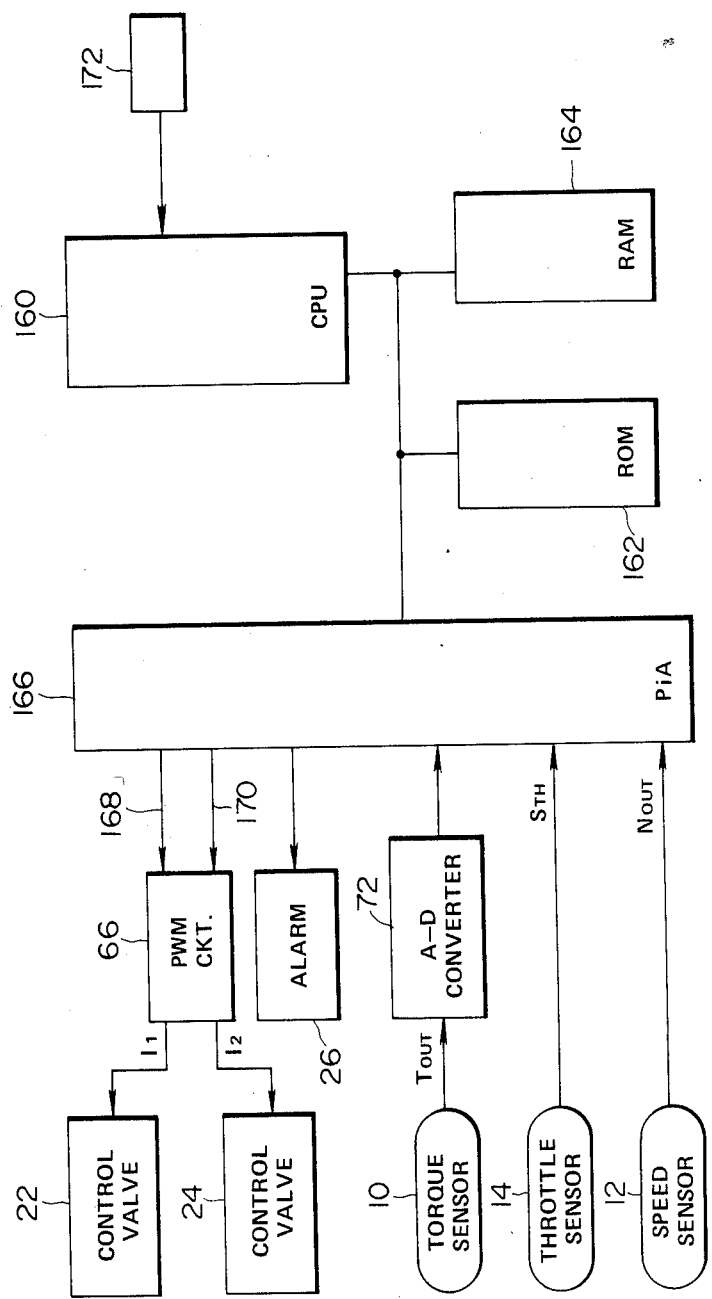
FIG. 4 is a block diagram illustrating the structure of a control unit using a microcomputer.

FIG. 4 is a general structure of the second example of the control unit using a microcomputer wherein denoted by the reference numeral 160 is a central processor unit (hereinafter called as a CPU) which operates based on the control program and control data stored in a read only memory 162 (abbreviated hereinafter as ROM). The ROM 162 stores control programs for gear ratio decision and for hydraulic servo pressure scheduling and control data for the fixed values used for them. The CPU 160, on the other hand, has the output torque signal $T_{OUT}$, throttle opening degree signal $S_{TH}$ and output shaft revolution speed signal $N_{OUT}$ to be converted by the corresponding converters (such as an A-D converter 72), respectively, into binary coded values and has a random access memory 164 (abbreviated hereinafter as RAM) to store the binary coded signals via an input output controller 166 (abbreviated hereinafter as PiA). The CPU 160 operates based on the stored data and the stored program within the RAM 164 and ROM 162 so as to make decisions as to scheduling of hydraulic pressure applied to each of the friction elements, and generates through the PiA 166 output signals 168 and 170. These output signals 168 and 170 are fed to a pulse width modulator circuit 66 (abbreviated hereinafter as PWM) to control the duty cycle of solenoid drive electrical current $I_1$ and the duty cycle of solenoid drive electrical current $I_2$, respectively.

THe mode of operation of the control system using the microcomputer is explained along with flowcharts of the control program shown in FIGS. 5 to 8. This control program operates in response to an interrupt signal which is generated at regular, predetermined intervals by a timer 172.

Figure 5:
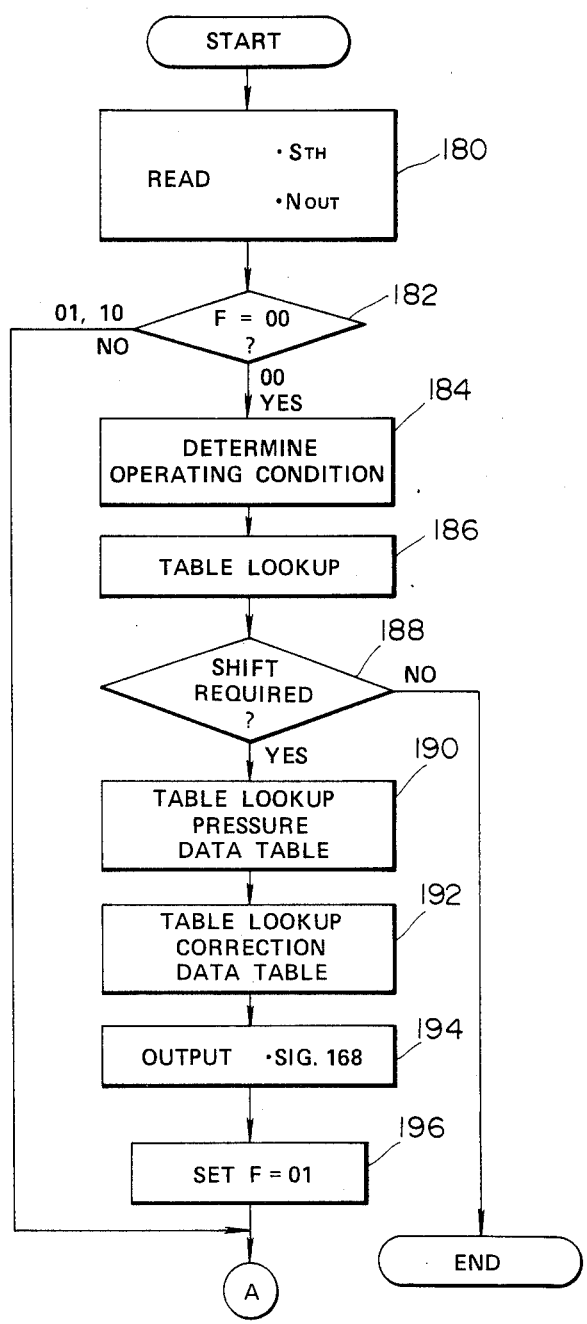
FIGS. 5 to 8 are flowcharts illustrating a control program employed by the control unit shown in FIG. 4.

Hereinafter, the control program is explained along with the flow chart shown in FIG. 5.

At step 180, the CPU 160 reads the input ports of the PiA 166 to store new values of throttle opening degree $S_{TH}$ and output shaft revolution speed $N_{OUT}$.

Figure 6:
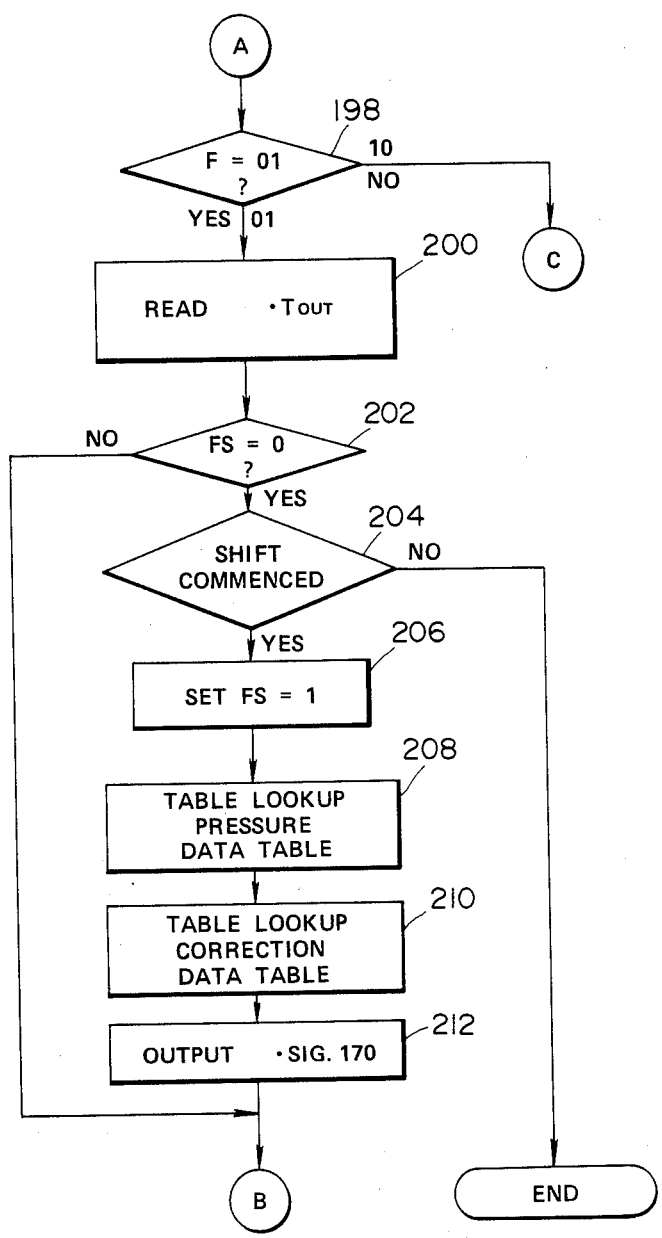

At step 182, the content of a control mode discrimination flag F is examined, and if the content is 00, the control goes to a step 184, while, otherwise the control goes to a step 198 shown in FIG. 6. The content of the flag F is set equal to 00 after the engine ignition switch has been turned ON, and it may switch to 01 or 00.

At step 184 and the subsequent step 186, operating condition is determined by the stored values of throttle opening degree $S_{TH}$ and output revolution speed $N_{OUT}$ and a speed ratio (i.e., a gear ratio) is determined by performing a table lookup operation of a gear shift table stored in the ROM 162 as a function of throttle opening degree value (corresponding to engine load value) and output shaft revolution speed value (corresponding to vehicle speed value).

At the subsequent step 188, a decision is made whether or not the result selected by the preceding step 186 executed during the previous run is different from the result selected by the step 186 during the present run to see if a shift in gear ratio is to be made.

At step 188, if a gear shift is not required, the present run is terminated, and otherwise the control goes to step 190. At the step 190 and the subsequent step 192, a pressure value of hydraulic pressure to be applied to a friction element to be engaged so as to commence a shift to be made (this friction element being the clutch 138 for 1-2 upshift and 2-3 upshift in the embodiment shown in FIG. 1) is determined. This hydraulic pressure is hereinafter called as a first clutch pressure $P_1$. At step 190, the CPU 160 utilizes a first clutch pressure $P_1$ data table stored in the ROM 162 to perform a table lookup operation to determine the proper value of the first clutch pressure $P_1$ as a function of a kind of gear shift to be made (such as 1-2 upshift or 2-3 upshift), stored values of throttle opening degree $S_{TH}$ and output shaft revolution speed $N_{OUT}$. This data table contains various values required under various operating conditions.

At the subsequent step 192, the CPU 160 utilizes a correction data table stored in the RAM 164 for the first clutch pressure $P_1$ to perform a table lookup operation to determine the proper correction value with which the result selected by the previous step 190 is to be corrected as a function of the stored values of the throttle opening degree $S_{TH}$ and output shaft revolution speed $N_{OUT}$. the result selected in the previous step 190 is corrected with the correction value obtained.

At step 194, this result, i.e., the first clutch pressure $P_1$, is outputted in the form of an output signal 168 via the PiA 166. This signal 168 is fed to the PWM circuit 66 to have it modify the duty cycle of the solenoid drive current $I_1$ supplied to the control valve 22. As a result, the hydraulic pressure applied ot the clutch 138 becomes equal to the first clutch pressure $P_1$ determined after execution of steps 190 to 194.

After execution of the steps 190 to 194, the mechanical shift operation starts, and thus the flag F is set equal to 01 at step 196 indicating that the shift operation is under progress. This content of the flag F is stored.

Referring to FIG. 6, at step 198, the content of the flag F is examined. At step 198, if the gear shift operation is under progress, the control goes to step 200, and otherwise to step 224 (see FIG. 8). At step 200, the CPU 160 reads the input port of the PiA 166 to store a new value of the output shaft torque $T_{OUT}$.

At step 202, the content of a flag FS is examined. This flag FS is utilized to judge whether or not the engagement of the clutch 138 has started. THe flag FS is 0 when the engagement of the clutch 138 has not yet started, while it switches to 1 when the engagement of the clutch 138 has started. The content of the flag FS is set equal to 0 after the engine ignition switch has been turned ON. If, at step 202, the flag FS is still equal to 0 indicating a condition where the clutch 138 has not yet started to engage although it had started shift operation, the control goes to step 204.

At step 204, a point A on the fully drawn line in FIG. 9(a) is found. At this point A, the clutch plates start engaging with each other to cause a rapid drop in the output torque $T_{OUT}$ to begin. At step 204, the stored value in the output torque $T_{OUT}$ resulting from the preceding step 200 is compared with the stored value obtained in the previous run, and it is examined whether or not the stored value in the output torque $T_{OUT}$ has continued to drop at a rate exceeding a predetermined value for a period of predetermined revolutions of the engine. If, at step 204, the output torque $T_{OUT}$ has continued to drop at the rate exceeding the predetermined value for the period of the predetermined revolutions of the engine, it is determined that the output torque $T_{OUT}$ has reached the point A and the control goes to step 206 and otherwise the control is terminated.

At step 206, the flag FS is set equal to 1. At step 208 and the subsequent step 210, a pressure value of hydraulic pressure to be applied to the other friction element (this friction element being the clutch 136 in the embodiment shown in FIG. 1) is determined. This hydraulic pressure is hereinafter called as a second clutch pressure $P_2$. At step 208, the CPU 160 utilizes a second clutch pressure $P_2$ data table stored in the ROM 162 to perform a table lookup operation to determine the proper value of the second clutch pressure $P_2$ as a function of a kind of gear shift to be made (such as 1-2 upshift or 2-3 upshift), stored values of throttle opening degree $S_{TH}$ and output shaft revolution speed $N_{OUT}$. This data table contains various values required under various operating conditions.

At the subsequent step 210, the CPU 160 utilizes a correction data table stored in the RAM 164 for the second clutch pressure $P_2$ to perform a table lookup operation to determine the proper correction value with which the result selected by the previous step 208 is to be corrected as a function of the stored values of the throttle opening degree $S_{TH}$ and output shaft revolution speed $N_{OUT}$. The result selected in the previous step 208 is corrected with the correction value obtained.

At step 212, this result, i.e., the second clutch pressure $P_2$, is outputted in the form of the output signal 170 via the PiA 166. This signal 170 is fed to the PWM circuit 66 to have it modify the duty cycle of the solenoid drive current $I_2$ supplied to the control valve 24. As a result, the hydraulic pressure applied to the clutch 136 becomes equal to the second clutch pressure $P_2$ determined after execution of steps 208 to 212.

From the preceding description, it will now be understood that the control of the second clutch pressure $P_2$ is initiated after the engagement of the first clutch 138 has started. The advantage of this control is made clear from the following description.

In the case of the transmission shown in FIG. 1, the clutch 138 operable on the first clutch pressure $P_1$, the clutch 136 operable on the second clutch pressure $P_2$ and the one-way clutch 134 are activated or released in accordance with the schedule shown in the following TABLE.

|  | CL 138 | CL 136 | CL 134 |
| --- | --- | --- | --- |
| 1st Speed | Released | Released | Activated |
| 2nd Speed | Released | Engaged | Released |
| 3rd Speed | Engaged | Released | Released |

Let us consider hereafter 2-3 upshift.

Let it now be assumed that the release of the clutch 136 is initiated before the commencement of the engagement of the clutch 138.

Figure 9:
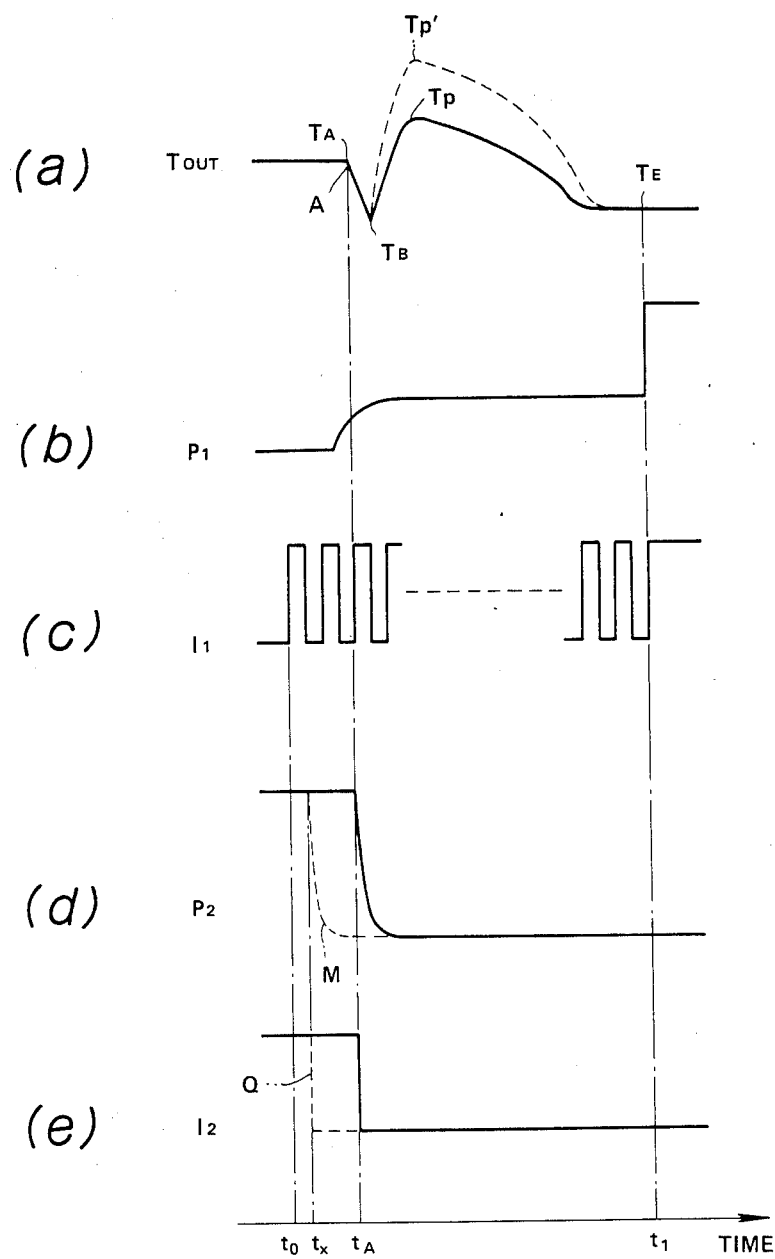
FIG. 9 is a timing diagram illustrating variations of various signals $T_{OUT}$, $P_1$, $I_1$, $P_2$, and $I_2$ during upshift.

This shift operation is explained along with FIG. 9 which illustrates 2-3 upshift. As shown by broken line curves Q and M in FIGS. 9(e) and 9(d), respectively, the duty cycle of the drive current $I_2$ is set equal to 0% at the instant $t_X$ between the preceding instant $t_0$ when the duty cycle of the drive current $I_1$ was set in accordance with the result selected after execution of steps 190, 192 and 194 (see FIG. 5) and the subsequent instant $t_A$ corresponding to the particular point A when the engagement of the clutch 138 starts. This causes the drive current $I_2$ to drop to zero as shown by the broken line curve Q, and the second clutch pressure $P_2$ to drop to 0 kg/cm$^2$ as shown by the broken line curve M. This causes the release of the clutch 136 to begin immediately after the instant $t_X$.

According to this 2-3 shift, the transmission is permitted to assume the first speed ratio since the both of the clutches 136 and 138 are released momentarily until the engagement of the clutch 136 starts. Thus, 2-1-3 shift will take place during a short period of time. This causes the occurrence of shift shocks.

Besides, the occurrence of such 2-1-3 shift during the short period of time leads to the generation of a peak torque $T_{P'}$ as shown in FIG. 9(a) which is substantially high. The generation of such high peak $T_{P'}$ is attributed to a large variation in engine speed caused by the shift operation mentioned above. The magnitude of variation in output torque during shift operation as illustrated by a hight between $T_B$ and $T_P$ (or $T_{P'}$) in FIG. 9(a) is closely related to the amount of inertia energy caused by drop in engine speed during the shift operation. Thus, the magnitude of output torque variation can be suppressued or reduced by decreasing the engine speed variation during the shift operation.

According to the invention, the release of the clutch 136 is initiated after the commencement of the engagement of the clutch 138 at the instant $t_A$ as shown by the fully drawn line in FIGS. 9(d) and 9(e) so that a 2-3 shift is made without establishing the first speed ratio. This results in alleviation of shift shock.

Referring back to FIGS. 6 and 7, after executing the steps 206, 208, 210 and 212, the control goes thereafter to the routine shown in FIG. 7 because the flag FS has been set equal to 1 at step 206.

Figure 7:
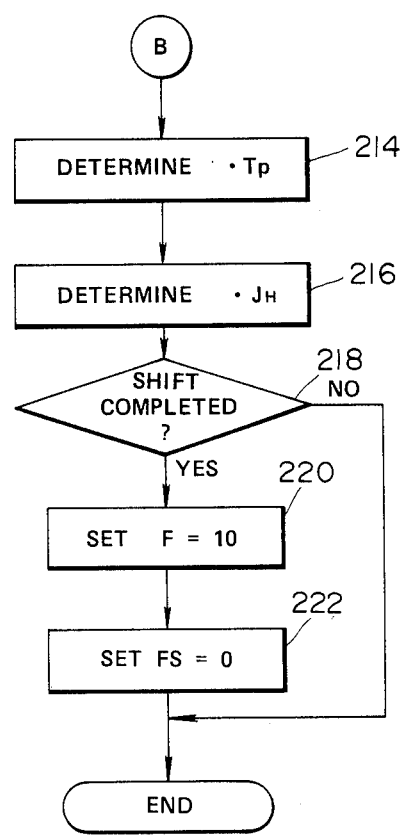

Referring to FIG. 7, at step 214 and the subsequent step 216, the peak torque $T_P$ of the variation of output torque during the shift operation and the time $J_H$ required from the shift operation are determined. In otherwords, the nature of the shift is recognized at these steps in terms of the peak torque $T_P$ and the time $J_H$.

At step 214, the stored value in the output torque $T_{OUT}$ selected by the preceding step 200 is compared with the stored value in the output torque obtained at step 200 during the preceding run and the larger one is stored at an address $T_P$. The execution of this step 214 is repeated until the shift is completed. Thus, the stored value at the address $T_P$ represents the peak torque of the variation in output torque during the shift operation.

At step 216, the CPU 160 starts counting clock pulses from the timer 172 and estimates based on the stored value in the output torque selected in the preceding step 200 (this stored value corresponds to $T_A$ in FIG. 9(a)) a value ($T_E$ in FIG. 9(a)) in the output torque which is to be accomplished upon completion of the shift operation and this estimated value is stored at an address $T_E$. In each subsequent run, the stored value in the output torque obtained in step 200 is compared with the stored value at the address $T_E$. The counting of clock pulses is terminated when the the stored value in the output torque obtained in the step 200 has attained a predetermined relationship with the stored value at the address $T_E$. The number of clock pulses counted is stored at an address $J_H$. Thus, the stored value at the address $J_H$ represents the time required for the shift operation after the control goes to step 220 after execution of step 218. At step 218, it is examined whether or not the shift operation is completed. The time required for the shift operation corresponds to the length between the instants $t_A$ and $t_1$ in the case of 2-3 shift shown in FIG. 9.

At step 218, a decision is made whether or not the stored value at the address $T_{OUT}$ satisfies the predetermined relationship with the estimated value stored at the address $T_E$. If, at step 218, the shift operation has not yet been completed, the execution of the present run terminates, so the execution of the steps 214 and 216 is repeated in the subsequent run, and otherwise the control goes to step 220. At step 220, the flag F is set equal to 10 and at the subsequent step the flag FS is set equal to 0.

Figure 8:
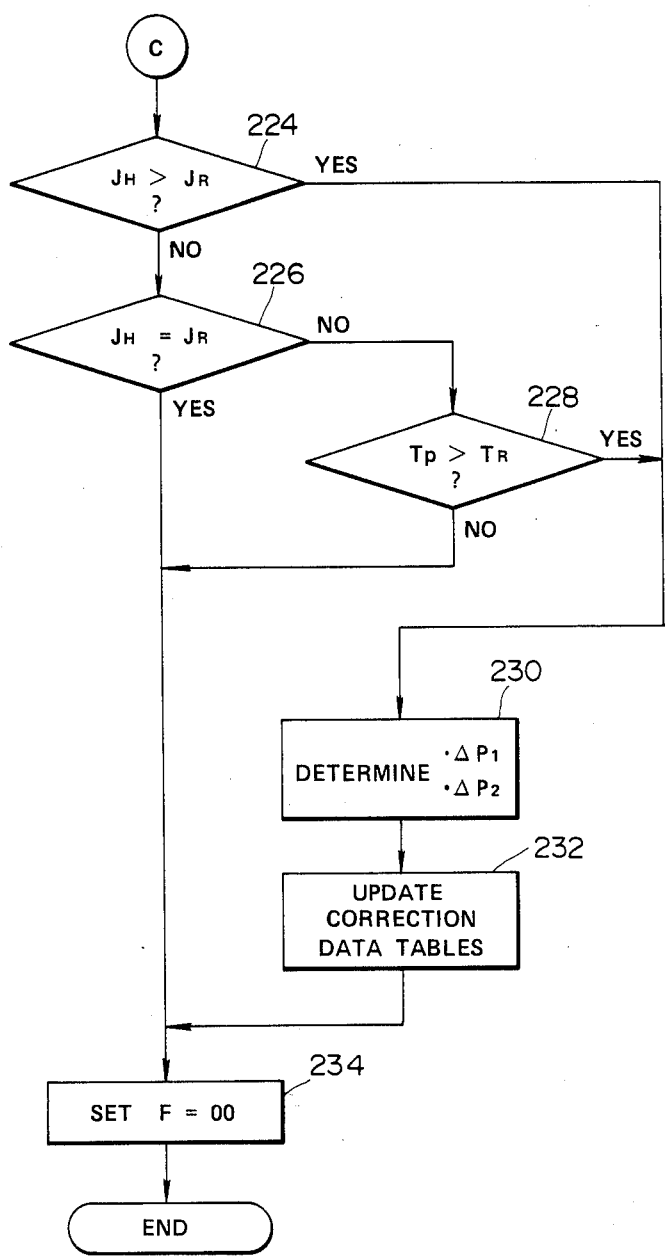

In the subsequent run, the control goes, after execution of step 198 (see FIG. 6), to step 224 shown in FIG. 8. At step 224 and the subsequent steps in FIG. 8, the previous shift operation is elavuated based on the stored values at the address $T_P$ and at the address $J_H$.

At the step 224, the stored value of the time $J_H$ obtained at the preceding step 216 (see FIG. 7) is compared with a reference time value $J_R$. If, at step 224, the time required for the shift operation is not greater than the reference time value $J_R$, the control goes to step 226, and otherwise to step 230. At step 226, a decision is made whether or not the time required for shift operation $J_H$ is equal to the reference time value $J_R$. If, at step 226, the time required for the shift operation $J_H$ is not equal to the reference time value $J_R$, the control goes to step 228, and otherwise to step 234.

At step 228, the stored value in the peak torque $T_P$ obtained in the preceding step 214 (see FIG. 7) is compared with a reference value $T_R$. If, at step 228, the peak torque $T_P$ is greater than the reference value $T_R$, the control goes to step 230, and otherwise to step 234.

At step 230 and the subsequent step 232, a correction value $\Delta P_1$ for the first clutch pressure $P_1$ and a correction value $\Delta P_2$ for the second clutch pressure $P_2$ are determined, and the corresponding data of the correction data tables are replaced with these new data obtained at the step 230.

If, at step 224, the time $J_H$ is greater than the reference time value $J_R$, the steps 230 and 232 are executed regardless of the magnitude of the peak torque $T_p$ because the preceding shift operation is not good. In this case, a new correction value is set as $\Delta P_1$ (if the preceding shift was 2-3 upshift) such that the same, next shift operation will be carried out with less time. That is, the correction is made so as to increase the pressure applied to the friction element which is to be engaged during shift operation. At the subsequent step 232, the stored datum at the address corresponding to the same operating condition and the same kind of shift for the preceding shift operation within the correction data table is replaced with the new datum obtained at the preceding step 230.

If, at step 226, the time $J_H$ is equal to the reference value $J_R$, the procedure of updating is not carried out because the preceding shift operation is good.

Figure 10:
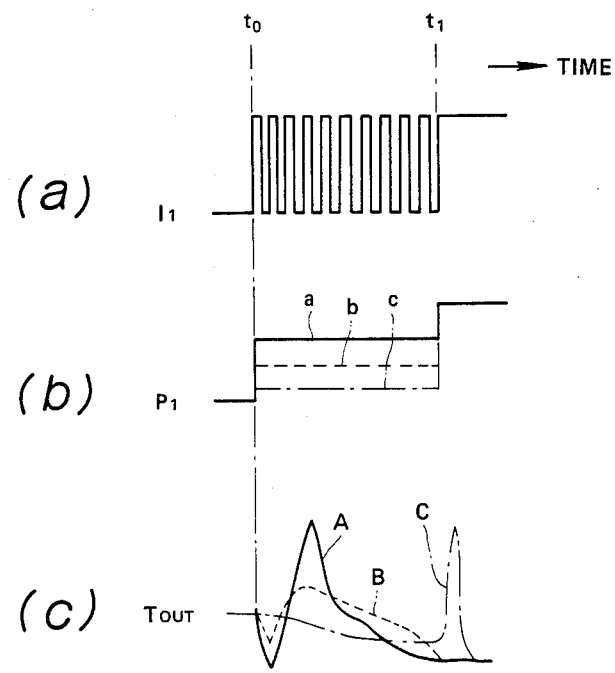
FIG. 10 is a timing diagram illustrating how the level of fluid pressure supplied to a friction element affects the pattern of variation in transmission output torque.

If, at step 224, the time $J_H$ is less than the reference $J_R$ and, at step 228, the peak torque $T_P$ is greater than the reference $T_R$, the preceding shift operation is not good because the magnitude of the peak torque is substantially great although the time required for the shift operation is sufficiently short. Thus, the correction of stored value in correction data table is needed. The coreection value is determined in the manner hereinafter described along with FIG. 10.

The manner of determining the correction value is explained taking the preceding 203 shift operation as an example.

Referring to FIG. 10(a). the drive current $I_1$ with the duty cycle corresponding to the first clutch pressure $P_1$ obtained at step 194 (see FIG. 5) is generated during a period from the instant $t_0$ to the instant $t_1$.

If the first clutch pressure $P_1$ generated in response to the drive signal $I_1$ and applied to the clutch 138 (see FIG. 1) is a level as shown by the fully drawn line a in FIG. 10(b), a substantially large torque peak as shown by the fully drawn curve A in FIG. 10(c) appears immediately after the commencement of the shift operation and causes great shift shocks because the clutch pressure $P_1$ is so high that the engagement of the clutch 138 is completed rapidly.

If the first clutch pressure $P_1$ is very low as indicated by the one-dot chain line c in FIG. 10(b), the completion of engagement of the clutch 138 is delayed and this causes the generation of peak torque immdietely before the completion of the shift operation as shown by one-dot chain line curve C in FIG. 10(c), thus causing substantially great shift shocks.

It follows that if the first clutch pressure $P_1$ is set equal to a level as shown by the broken line b in FIG. 10(b), this result in providing a preferred output torque variation curve as shown by the broken line curve B in FIG. 10(c) where the peak torque is suppress to a sufficiently low level.

Thus, if the time $J_H$ is less than the reference $J_R$ and the peak torque $T_P$ is greater than the reference $T_R$, a new correction value is set as $\Delta P_1$ such that the peak torque $T_P$ will be suppressed and the completion of engagement of the clutch will not be delayed. That is, the correction is made so as to decrease the pressure applied of the clutch to be engaged toward the above mentioned level shown by the broken line b in FIG. 10(b).

Referring back to FIG. 8, if the time $J_H$ is less than the reference $J_R$ and the peak torque $T_P$ is equal to or less than the reference $T_R$, no correction is made because the preceding shift operation is good. At step 88, the flag F is reset equal to 00.

Figure 11:
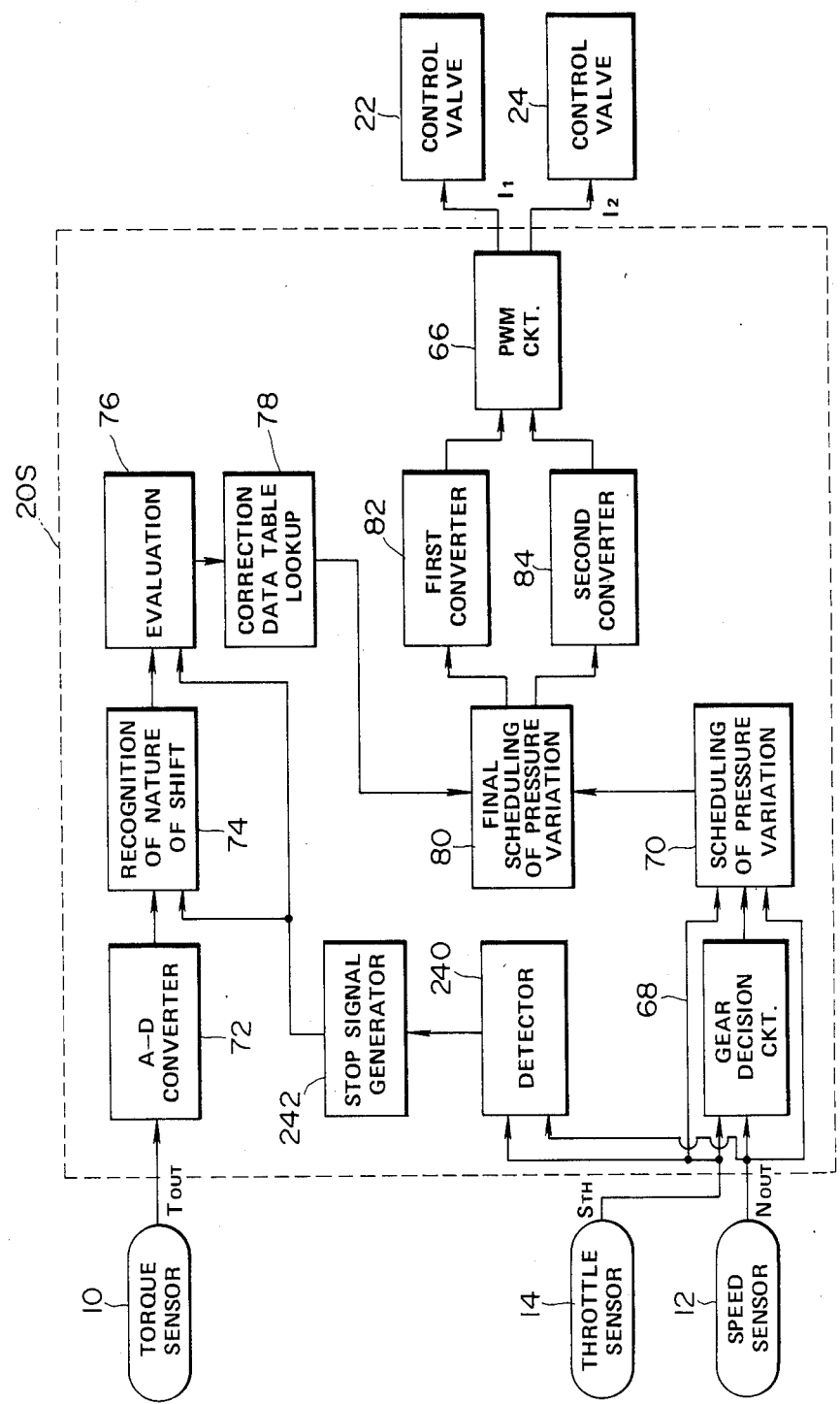
FIG. 11 is a similar view to FIG. 3 and illustrates another example of a control unit.

Referring to FIG. 11, another embodiment of a control unit is hereinafter described. The control unit now denoted by the reference numeral 20S is substantially the same as the control unit 20 shown in FIG. 3 except the provision of two function blocks 240 and 242.

At the detector block 240, a change in throttle opening degree $S_{TH}$ and a change in output revolution speed $N_{OUT}$ are detected during a time period beginning with the commencement of a shift operation and ending with the completion of the shift operation. If these changes exceed reference values, respectively, it is determined that operating condition has changed.

If it is determined that the operating condition has changed, a stop signal is generated at the function block 242. This stop signal is supplied to the function blocks 74 and 76 to cause them to terminate their operations.

The above mentioned operation of the control unit 20S may be performed by the control unit using the microcomputer shown in FIG. 4 only if the control program is slightly modified as will be hereinafter explained along with the flowcharts shown in FIGS. 12 and 13.

Figure 12:
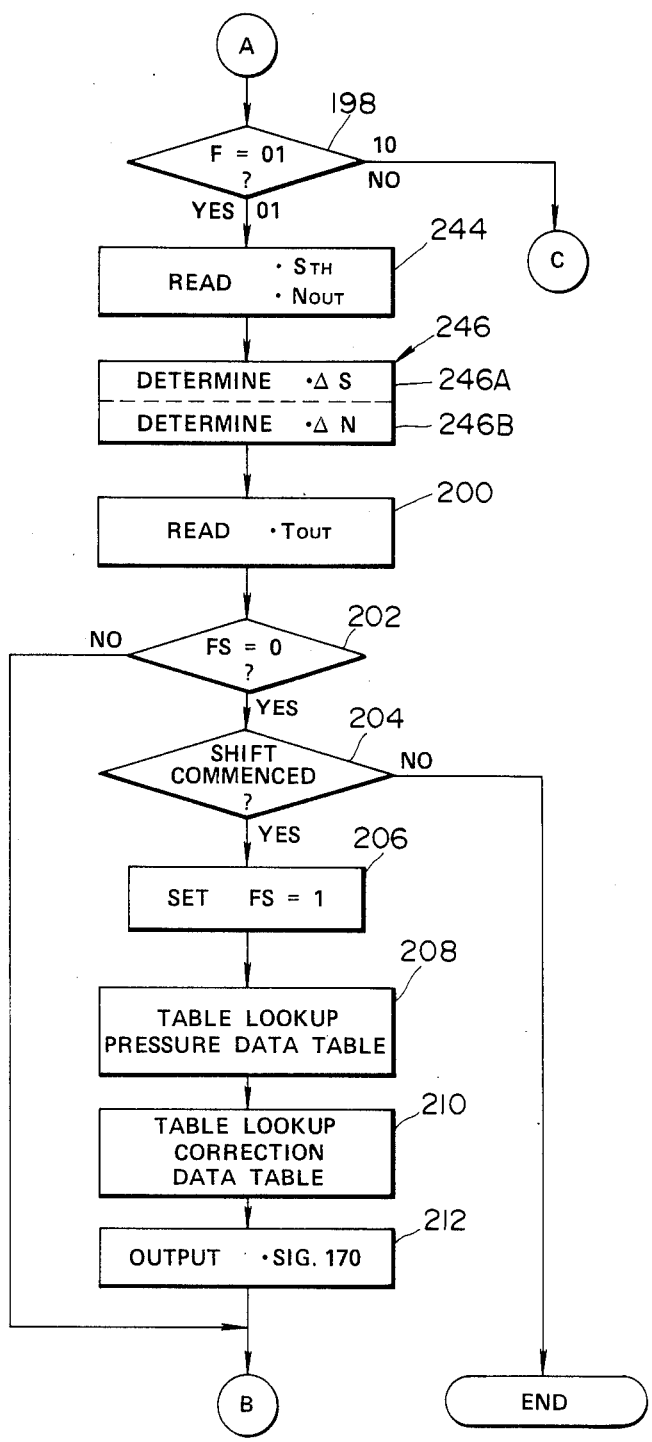
FIGS. 12 to 13 are flowcharts illustrating a modified routine implementing the control strategy described in connection with FIG. 11.
Figure 13:
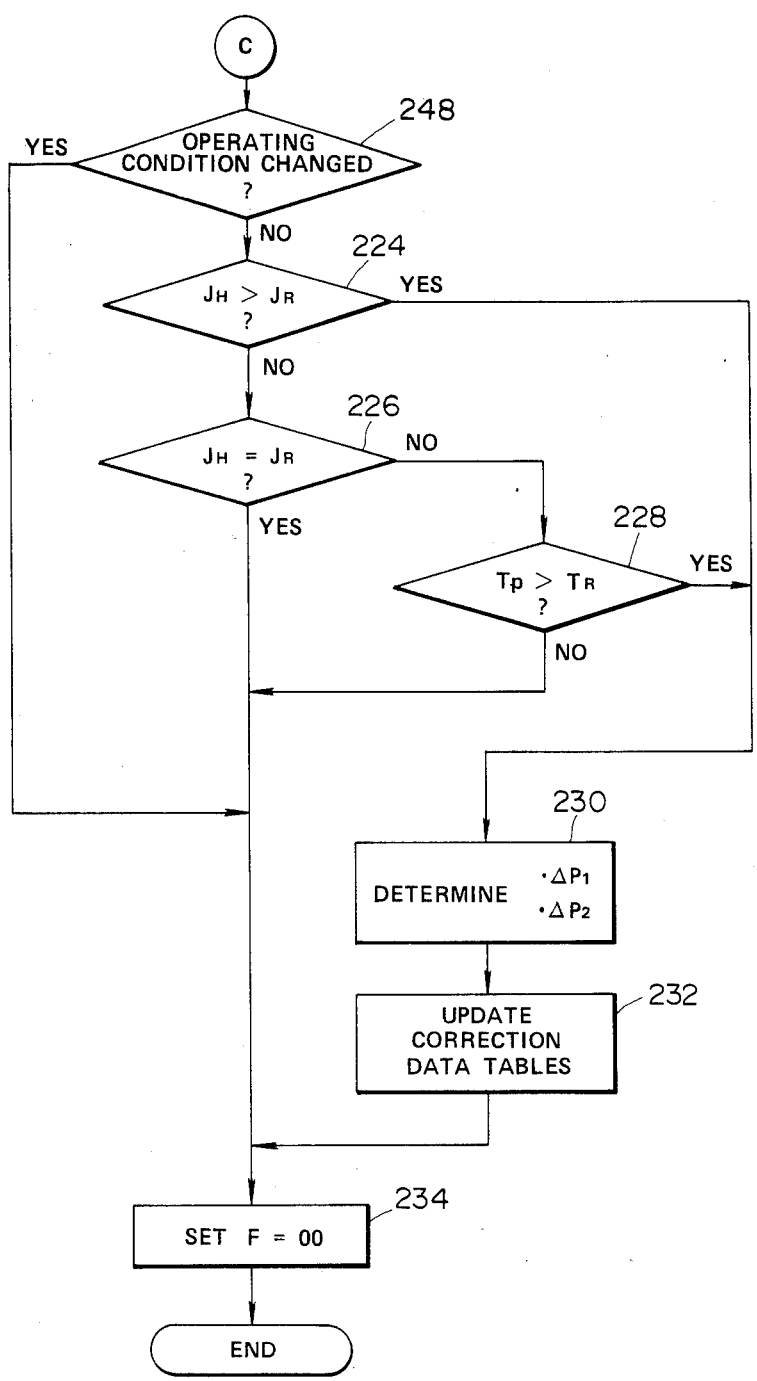

The flowcharts shown in FIGS. 12 and 13 are substantially the same as the flowcharts shown in FIGS. 6 and 8, respectively, except the addition of steps 244 and 246 in FIG. 12 and of step 248 in FIG. 13.

Referring to FIG. 12 and also to FIG. 4, at step 244, the CPU 160 reads the input ports of the PiA 166 to store new values of throttle opening degree $S_{TH}$ and output shaft revolution speed $N_{OUT}$.

Step 246 is made up of two steps 246A and 246B. At step 246A, stored value of throttle opening degree $S_{TH}$ obtained at the preceding step 244 is compared with the stored value obtained at step in the previous run and this operation is repeated during the period of shift operation so as to determine a difference $\Delta S$ between the maximum and the minimum values of throttle opening degree $S_{TH}$. At step 246B, a difference $\Delta N$ between the maximum and minimum values of output shaft revolution speed $N_{OUT}$ is determined similarly.

Referring to FIG. 13, before entering into the evaluation stage of the preceding shift operation, step 248 is executed. At step 248, it is examined whether or not the operation condition has changed during shift operation based on the stored values of $\Delta S$ and $\Delta N$. If, at step 248, the stored values of $\Delta S$ and $\Delta N$ are greater than reference values, respectively, the control goes to step 234, and otherwise to step 224.

As will now be understood from the preceding description, when the operating condition has changed during a shift operation, evaluation of the shift operation and the subsequent correction of the correction table data are not carried out. This is because, if the external disturbances such as a great change in throttle opening degree and/or a great change in output shaft revolution speed exist during a shift operation, the accurate recognition of the variation of output shaft torque of the shift operation is not possible.

Figure 14:
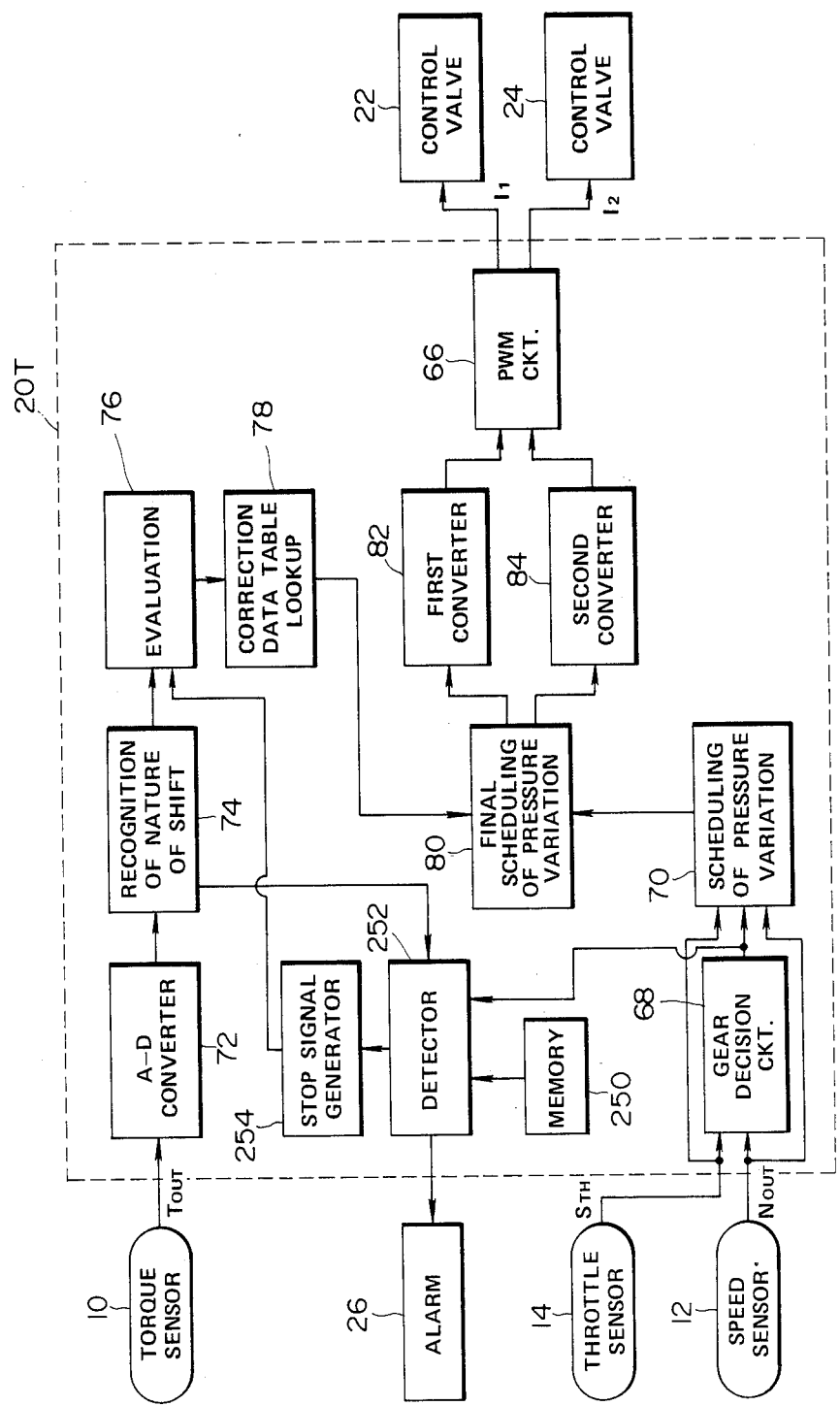
FIG. 14 is a similar view to FIG. 3 and illustrates still another example of a control unit.

Referring to FIG. 14, a further embodiment of a control unit is hereinafter described. The control unit now denoted by the reference numeral 20T is substantially the same as the control unit 20 shown in FIG. 3 except the addition of function blocks 250, 252 and 254.

At the memory block 250, a basic variation pattern of output shaft torque for each of various kinds of shift is stored (this pattern is hereinafter called as "a basic pattern").

At the detector block 252, an actually occurring pattern of variation of output shaft torque (this pattern is called as "an actual pattern") recognized by the block 74 is compared with the basic pattern from the memory block 250. Based on the difference existing between these two patterns, it is determined whether or not the operation of the torque sensor 10 is abnormal.

If the abnormal operation of the torque sensor 10 is determined at the block 252, the stop signal generator block 254 stops the operation of the evaluation block 76. At the same time, the alram26 is activated to generate an alarm signal.

The above mentioned operation of the control unit 20T may be performed by the control unit using the microcomputer shown in FIG. 4 only if the control program is slightly modified as will be hereinafter explained along with the flowchart shown in FIG. 15.

Figure 15:
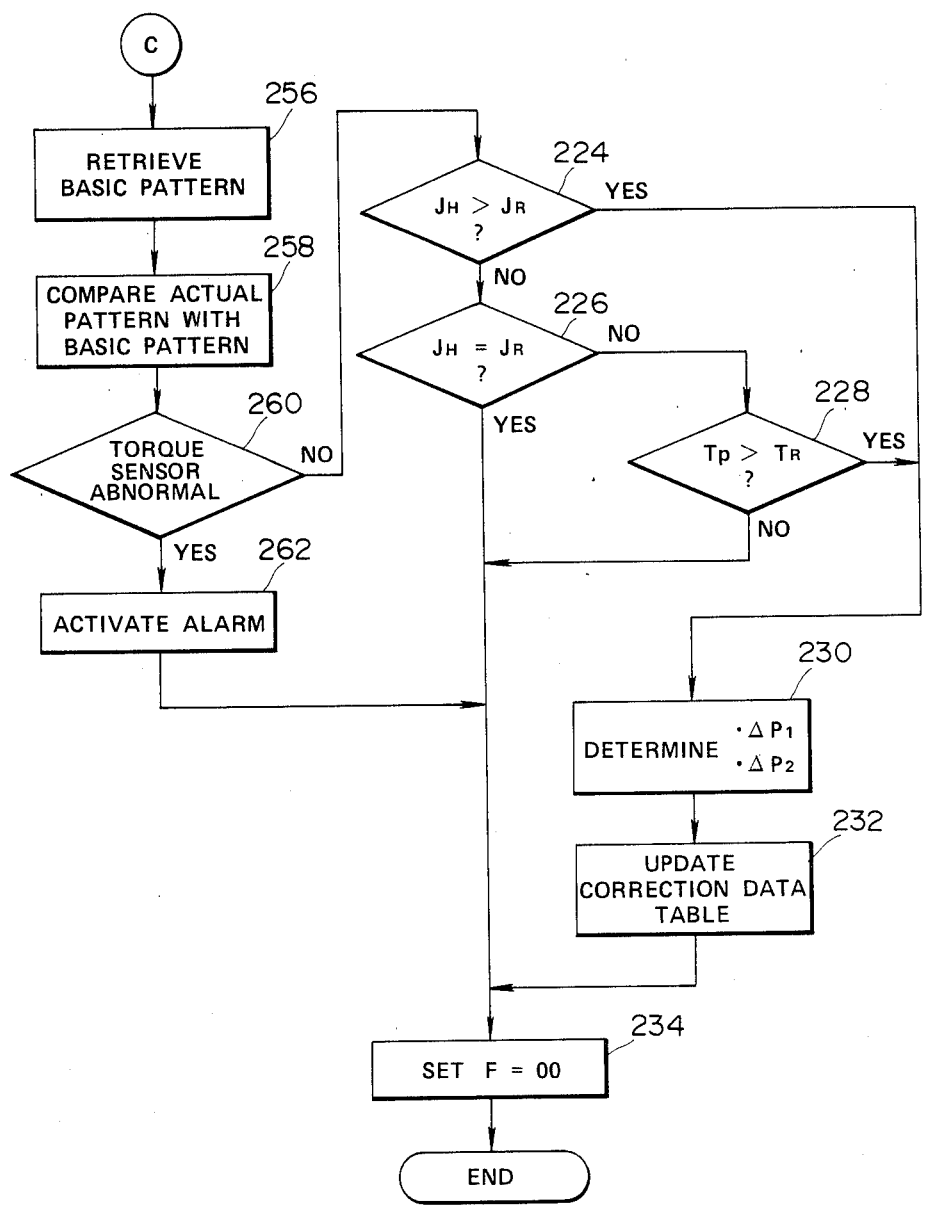
FIG. 15 is a flowchart illustrating a modified routine implementing the control strategy described in connection with FIG. 14.

The flowchart shown in FIG. 15 is substantially the same as the flowchart shown in FIG. 8 except the addition of steps 256, 258, 260 and 262.

Referring to FIG. 15 and also to FIG. 4, at step 256, the CPU 160 retrieves a basic pattern stored in the form of data table within the ROM 162. The basic pattern is different depending on kinds of shift, and it is made up of three different patterns. For example, three different patterns A, B and C as shown in FIG. 10(c) make up the basic pattern for the 2-3 upshift.

At step 258, a series of values of $T_{OUT}$ stored as the function of time during the shift operation are read to make up the actual pattern, and the actual pattern is compared with the three difference patterns A, B and C making up the basic pattern.

At step 260, the result obtained in the preceding* step 258 is examined. If the actual pattern does not have any characteristic found in the three different patterns of the basic pattern, the control goes to step 262. Thus, the evaluation operation beginning with the step 224 and the subsequent operation of correcting the correction data table are not performed. At step 262, the alram 26 is activated. If, at step 260, it is determined the torque sensor 10 operates normally, the control goes to step 224 to to evaluate the nature of the preceding shift operation.

What is claimed is:

1. A control system for an automatic transmission, comprising:
   torque sensor means for detecting an output shaft torque of the automatic transmission which varies in a pattern in effecting shifting in the automatic transmission;
   a control unit including means for recognizing the pattern of variation of the output shaft torque detected by said torque sensor means, means for evaluating the pattern of variation recognized, and means for determining a variation of fluid pressure to be supplied to a friction element in response to the result of the evaluation of the pattern of variation recognized; and means for regulating a fluid pressure supplied to said friction element in response to said variation of fluid pressure determined, whereby said fluid pressure supplied to the friction element is appropriately adjusted to alleviate substantial shift shock in effecting the same shifting by said friction element subsequently.

2. A control system as claimed in claim 1, wherein said recognizing means calculates a peak value in the pattern of variation and a time required for effecting shifting by the friction element, and wherein said evaluating means compares said peak value with a predetermined reference peak value and said time with a predetermined time.

3. A control system for an automatic transmission which effects shifting by engaging a first friction element and releasing a second friction element, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means, means for evaluating the pattern of variation recognized, and means for determining a first variation of fluid pressure to be supplied to the first friction element and a second variation of fluid pressure to be supplied to the second friction element in response to the result of evaluation of the pattern of variation recognized; and means for regulating a fluid pressure supplied to the first friction element in response to said first variation of fluid pressure determined;

means for regulating a fluid pressure supplied to the second friction element in response to said second variation of fluid pressure determined;

whereby said first and second fluid pressures are regulated such that the releasing the second friction element is commenced after the commencement of engaging the first friction element.

4. A control system for an automatic transmission, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means and means for evaluating the pattern of variation recognized, and means for determining a variation of fluid pressure to be supplied to a friction element in response to the result of the evaluation of the pattern of variation recognized; and means for regulating a fluid pressure supplied to friction element in response to said variation of fluid pressure determined;

said control unit further including means for detecting a change in operating condition of the vehicle, and means for ceasing the regulation of fluid pressure supplied to the friction element upon detection of said change by said change detecting means.

5. A control system for an automatic transmission, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means, means for evaluating the pattern of variation recognized, and means for determining a variation of fluid pressure to be supplied to a friction element in response to the result of evaluation of the pattern of variation recognized; and means for regulating a fluid pressure supplied to said friction element in response to said variation of fluid pressure determined;

said control unit further including means for detecting an abnormal operation of said torque sensor mean, and means for ceasing the regulation of fluid pressure supplied to the friction element upon detection of the abnormal operation by said abnormal operation detecting means.

6. A control system for an automatic transmission, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means, means for evaluating the pattern of variation recognized, and means for scheduling a variation of fluid pressure to be supplied to a friction element in response to the result of evaluation of the pattern of variation recognized; and means for regulating a fluid pressure supplied to said friction element in response to said variation of fluid pressure scheduled.

7. A control system for an automatic transmission which effects shifting by engaging a first friction element and releasing a second friction element, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means, means for evaluating the pattern of variation recognized, and means for scheduling a first variation of fluid pressure to be supplied to the first friction element and a second variation of fluid pressure to be supplied to the second friction element in response to the result of evaluation of the pattern of variation recognized; and means for regulating a fluid pressure supplied to the first friction element in response to said first variation of fluid pressure scheduled;

means for regulating a fluid pressure supplied to the second friction element in response to said second variation of fluid pressure scheduled.

8. A control system for an automatic transmission, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means and means for evaluating the pattern of variation recognized, and means for scheduling a variation of fluid pressure to be supplied to a friction element in response to the result of evaluation of the pattern of variation recognized; and means for regulating a fluid pressure supplied to friction element in response to said variation of fluid pressure scheduled.

9. A control system for an automatic transmission, comprising:

torque sensor means for detecting an output shaft torque of the automatic transmission which varies in a pattern in effecting shifting in the automatic transmission;

a control unit including means for recognizing the pattern of variation of the output shaft torque detected by said torque sensor means, means for evaluating the pattern of variation recognized, and means for scheduling a variation of fluid pressure to be supplied to a friction element in response to the result of evaluation of the pattern of variation recognized; and means for regulating a fluid pressure supplied to said friction element in response to said variation of fluid pressure scheduled;

said control unit further including means for detecting an abnormal operation of said torque sensor means, and means for ceasing the regulation of fluid pressure supplied to the friction element upon detection of the abnormal operation by said abnormal operation detecting means.

10. A method of controlling a shift in an automatic transmission, comprising the steps of:

detecting an output shaft torque of the automatic transmission during the shift;

recognizing a pattern of variation of the output shaft torque detected;

evaluating the pattern of variation recognized;

scheduling a variation of fluid pressure to be supplied to a friction element to be engaged during the shift in response to the result of evaluation of the pattern of variation; and regulating a fluid pressure supplied to said friction element in response to said variation of fluid pressure scheduled during the subsequent occurrence of the shift.

11. A control system for an automatic transmission, comprising:

a control unit including a memory storing a basic data table containing information regarding a shift, a correction data table containing correction factors to be combined with the information contained in the basic data table, means for determining a desired variation of fluid pressure supplied to a friction element during the occurrence of a shift of the automatic transmission, and means for generating an output signal indicative of said desired variation of fluid pressure supplied to the friction element;

means responsive to said output signal for regulating a fluid pressure supplied to said friction element during the occurrence of the shift; and torque sensor means for detecting an output shaft torque of the automatic transmission during occurrence of the shift of the automatic transmission;

wherein said control unit further includes means for recognizing a pattern of variation of the output shaft torque detected during the occurrence of the shift, means for evaluating the pattern of variation recognized, and means for correcting the correction factors contained in said correction data table in response to the result of evaluation of the pattern of variation recognized.

* * * * *